(12) United States Patent
Anderson et al.

(10) Patent No.: US 6,233,332 B1
(45) Date of Patent: May 15, 2001

(54) SYSTEM FOR CONTEXT BASED MEDIA INDEPENDENT COMMUNICATIONS PROCESSING

(75) Inventors: Gregory Lane Anderson, Dallas, TX (US); Lucinda M. Sanders, Boulder, CO (US); Robert W. Donnelly, New Brunswick, NJ (US); Eugene Mathews, Barrington, IL (US); Mark Landers, Fair Haven, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/089,788

(22) Filed: Jun. 3, 1998

(51) Int. Cl.[7] ................................................. H04M 3/00
(52) U.S. Cl. ............................ 379/265; 379/207; 379/242
(58) Field of Search ..................................... 379/265, 266, 379/309, 242, 201, 207, 219, 220, 221; 370/270, 271, 351, 352, 901

(56) References Cited

U.S. PATENT DOCUMENTS

| 5,008,930 | * | 4/1991 | Gawrys et al. | 379/210 |
| 5,452,350 | * | 9/1995 | Reynolds et al. | 379/220 |
| 5,491,742 | * | 2/1996 | Harper et al. | 379/201 |
| 5,610,910 | * | 3/1997 | Focsaneanu et al. | 370/351 |
| 5,848,143 | * | 12/1998 | Andrews et al. | 379/219 |
| 5,946,386 | * | 8/1999 | Rogers et al. | 379/265 |

* cited by examiner

Primary Examiner—Ahmad Matar
Assistant Examiner—Benny Q. Tieu
(74) Attorney, Agent, or Firm—Duft, Graziano & Forest, P.C.

(57) ABSTRACT

The present media independent communications processing system functions to provide business useful services to customers with the anymedia resources that are required to satisfy the customer's request. In particular, the system carries call information across the entirety of a transaction with the call being managed as an anymedia multi-transactional event. The model used for the present media independent communications processing system, as embodied in a call center, comprises a hallways and rooms paradigm that enables the customer to dynamically navigate their anymedia communications connection to a desired information providing source. As the customer's call is routed during the duration of the communication session, the call context information is stored and used by the rules-based call routing process to identify a source of information/services that is best adapted to serve the needs of this customer. The communication connection is viewed as one segment of a potentially long-term interaction between customer and service provider, with the present media independent communications processing system providing both the customer and serving agent with access to relevant customer and service provider data. In this example, the customer context information includes, but is not limited to: customer data, customer profile/preferences/history, environment data; while the corresponding agent context information includes, but is not limited to: agent skills and job function, agent queue length, fairness of call routing.

50 Claims, 4 Drawing Sheets

SYSTEM FOR CONTEXT BASED MEDIA INDEPENDENT COMMUNICATIONS PROCESSING

FIELD OF THE INVENTION

This invention relates to call processing systems and, in particular, to a rules-based call center routing process that utilizes the identity of the calling party, the call context and media capabilities of the calling party to route the call to a destination that is appropriate to the call in terms of media communications capabilities and type of desired service.

PROBLEM

It is a problem in communication systems to extend the basic call management paradigm of voice-based communications to provide the services and capabilities required of "anymedia" communications, wherein the term "anymedia" as used herein refers to the ability of the calling party to use any one or a combination of a number of different media to initiate the call. In particular, in a voice call, as parties are added to the call, a voice path is set up so that the newly added parties can communicate with all of the parties presently on the voice call. If a party drops from the voice call, the voice path between that person and all of the remaining parties to the voice call is dropped. The voice call is spontaneous and does not require the prearranged set up of communication facilities. The voice call model is therefore a one-dimensional model with the voice calls being characterized by their physical call connections. The controlling call processing system simply manages the physical call connections and no information is remembered either about the voice call once the voice call is completed or about a party to the voice call if the party hangs up during the progress of the voice call. The departing party is erased from memory once they depart and, upon call completion, the call connection data is also erased.

In the simplest form, an anymedia call should be an extension of the voice call of today, comprising any combination of audio, video, desktop data, or image services that are transmitted among the parties to the call. If the separate media types are bundled in a single call, the communication facilities for each media type can be handled in a consistent and expected way. For example, if a person drops a call involving audio and video, both types of media facilities are dropped automatically and simultaneously. If other people are conferenced onto the call, they receive all of the presently active types of media for which they are enabled. An anymedia call would ideally be as easy to use as voice calling is today, since it would behave in expected ways, and not require the people involved in the call to perform extra or complex work to establish the anymedia connection. However, this is not the case in existing call management systems. The provision of other than simple voice communications requires that the users expend a significant amount of effort to communicate via a selected set of media types. In addition, the media are not integrated and the communication connections that are established to serve an anymedia call are typically immutable for the call duration, with the ability to release a particular media facility during the call connection being an impossible task.

A further problem with anymedia communications in customer service scenarios, such as a call center, is that many existing information access systems are architected for voice-only access and in a manner to minimize the cost of providing the offered services pursuantto some predefined level of responsiveness to customers' requests. For example, a call center comprises an automated call management system where customers can access information regarding products and services that are offered by the call center operator. The call center is generally staffed by a number of agents who answer queries from the customers, provide information, and take customer orders. In order to increase the efficiency of operation of the call centers, these systems are architected to force a customer's incoming call down a predefined path through an immutable response hierarchy. While this reduces the cost of providing the agents and yet provides a modicum of service to the customers, these call center systems are limited in their ability to truly serve each particular customer's needs. In particular, the incoming call is queued as a function of the type of media, thereby requiring the implementation of multiple disjunct queues, each having different call management parameters and customer wait times. Furthermore, the call connection to a particular agent represents a localized transaction that cannot easily be forwarded to another agent during the processing of the call connection while retaining the call context. For example, the order entry agent cannot easily forward any information regarding the customer if the call is transferred to another agent and the customer must again provide the information requested by the original agent. This process is frustrating to both the agent and the customer. In addition, the call center operator may have extensive information regarding the customer, their existing orders, past orders, preferences, account balance, and the like, but this information is distributed over numerous databases within the organization and cannot easily be used to enhance the level of services provided in the processing of the customer's incoming call.

In summary, existing communications systems are lacking in their simplicity of use and ability to integrate the numerous disjunct information systems that are in use in commerce. As an example, call centers represent a typical instance where anymedia communications, integrated with an information system, would be beneficial to both the customers who access the call center and the call center operator, yet such integrated communications are unavailable for use in this application.

SOLUTION

The above described problems are solved and a technical advance achieved by the present system for context based media independent communications processing that functions to provide business useful services to customers with the media resources and customer-specific data, that is stored in a call "context," that are required to satisfy the customer's request. In particular, the capabilities of this media independent communications processing system are illustrated in the call center example used above. The present media independent communications processing system functions to carry call information across the entirety of a transaction with the call being managed as an anymedia multi-transactional event surrounded by a "context" of customer-specific data.

The architecture used to implement the present media independent communications processing system in the call center application can be modeled with a hallways and rooms paradigm that enables the customer to dynamically navigate their anymedia communications connection to a desired information providing source hence fulfilling their request. The incoming call is processed through a universal work queue for agents, which enables the call center system administrator to adjust the media mix of the incoming call connections for each agent or group of agents while also monitoring call center statistics across all media types. Also, the agents who staff the call center are not dedicated to processing only a single type of media call, but can receive incoming calls of varying media types, as their terminal equipment permits. As the present media independent communications processing system routes the customer's call during the duration of the communication session, the call context information is stored and used by the rules-based call routing process to route the call to a source of information/services that is best adapted to serve the needs of this customer during this and future communication sessions. The present communication session is viewed as one segment of a potentially long-term interaction between customer and service provides with the present media independent communications processing system providing both the customer and serving agent with access to relevant customer and service provider data via the call context. In this example, the customer call context information includes, but is not limited to: customer data, customer profile/preferences/history, environment data; while the corresponding agent call context information includes, but is not limited to: agent skills, agent queue length, fairness of call routing with respect to the agent pool, agent job function, and the like. Furthermore, the anymedia capabilities of the customer are considered in the rules-base call routing process. The various agents and automated information sources available to the present media independent communications processing system are dynamically incorporated into the communication connection on an as needed basis in order to benefit from the anymedia communications potential of the system.

Thus, the present media independent communications processing system implements a rules-based call routing process that utilizes the identity of the calling party, the call context and anymedia content of a communication connection to effect routing the call to a destination that is appropriate to the call in terms of anymedia communications capabilities and information content, via a call context, in a manner heretofore unknown in call processing.

DETAILED DESCRIPTION

A basic premise of anymedia calling is to bundle various media types into a single call between two or more people, using whatever media specific communication facilities that are necessary to serve the call connection. In the simplest form, a anymedia call is an extension of the voice call of today, with audio service between people being augmented by the provision of video, and/or desktop data, and/or image communications. Because these separate media types are bundled in a single call, each media type can be handled in a consistent and expected way. For example, if a person drops a anymedia call involving audio and video, the facilities that serve both media types are dropped automatically and simultaneously. If other people are conferenced (or transferred, or placed on hold, etc.) onto an existing anymedia call, they receive all media communications in use on the existing anymedia call by the provision of the necessary communication facilities. Anymedia calls can be set up initially with more than one communication facility and media types can be added or dropped at any time during the duration of the anymedia call. An anymedia call should ideally be as easy to use as voice calling is today. It should behave in expected ways, and not require the people involved in the anymedia call to perform extra or complex work to establish the anymedia connections that serve the anymedia call.

Figure 1:
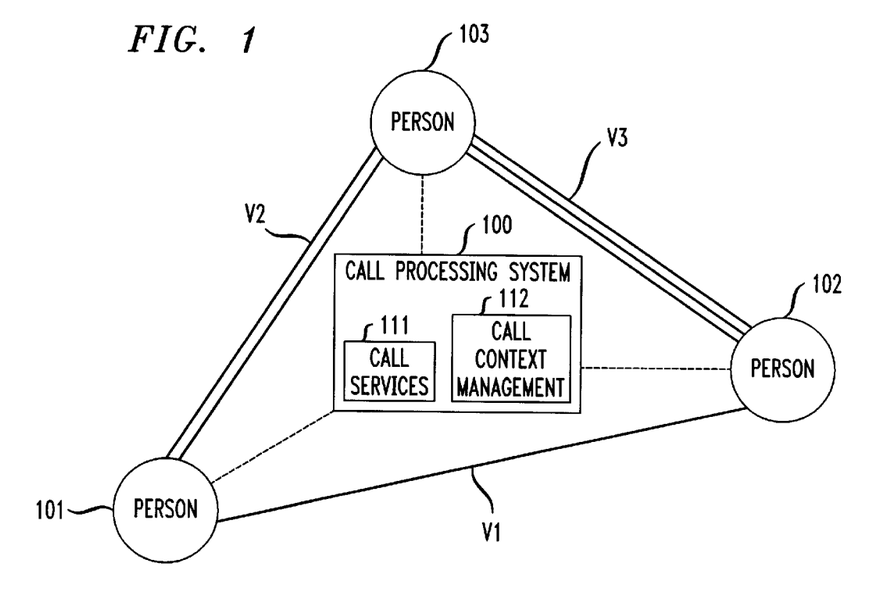
FIG. 1 illustrates diagrammatically the anymedia call model used to manage such communications connections.

Anymedia communication services evolve from both the voice and data worlds and it is important that products that offer anymedia communications be tightly coupled into both the voice and data networks where these services reside. The anymedia communications must be business useful to be effective solutions to customers' communications problems. An example of a anymedia call is illustrated in FIG. 1. A call processing system 100 functions to manage the communication facilities that serve to interconnect the various parties to the call. The facilities that are shown interconnecting the parties can be unique for each of the types of media, or can be shared facilities that function to concurrently provide several types of media communications on the same physical transmission medium. In this anymedia call, two parties 101, 102 are only connected by voice communication facilities V1 while voice, video and data communication facilities V2 and V3 interconnect parties 101, 103 and 102, 103, respectively. Since it is desirable that media can come and go during the progress of the anymedia call, the call processing system 100 must manage call connections as with voice calls: spontaneous call connections with parties and media freely able to be added and removed from the anymedia call. A differentiating factor with the anymedia call is that the call processing system 100 includes a call context management process 112 that stores data indicative of the particulars of the anymedia call, such as customer media capabilities/preferences and customer history data, which data is termed call "context." Support for this degree of service is implemented in the form of call services system 111 that functions to interconnect the resident operating system of the call processing system 100 and the application software that is used to implement various any media services in the call context management process 112 to enable communications applications to be realized independent of the resident operating system, the network transport, interworking algorithms and the like.

Anymedia Calling Model

The communications model used herein for anymedia calls is an extension of this well known concept from the voice world. Enhancing the voice calling model for anymedia results in a model for the anymedia customer interface and the integration of anymedia technology. Anymedia calling is an important customer level service and fits in broadband network implementations.

The anymedia calling concept is disclosed in FIG. 1 noted above where there is a need for persistent call data to enable the call processing system 100 to provide business useful services by dynamically managing the associated anymedia communications resources. In this system, call services 111 implements a rules-based call routing process to control the switch/communications fabric as well as content/protocol of the physical interconnections. The rules-based call routing process also maintains the call context information of call context management process 112 to enable the provision of communication services that are appropriate for anymedia and customer-specific transactions in call centers as described below.

Call Center Architecture Example

Figure 2:
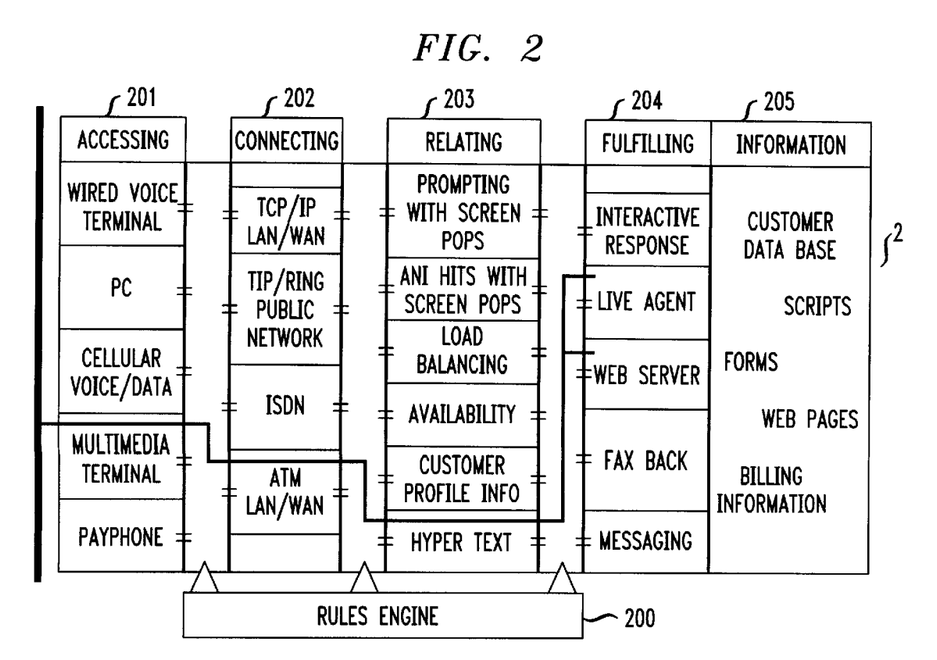
FIG. 2 illustrates in block diagram form the preferred embodiment of a call center architecture that uses the anymedia call model of FIG. 1 and a rules-based call management paradigm.
Figure 3:
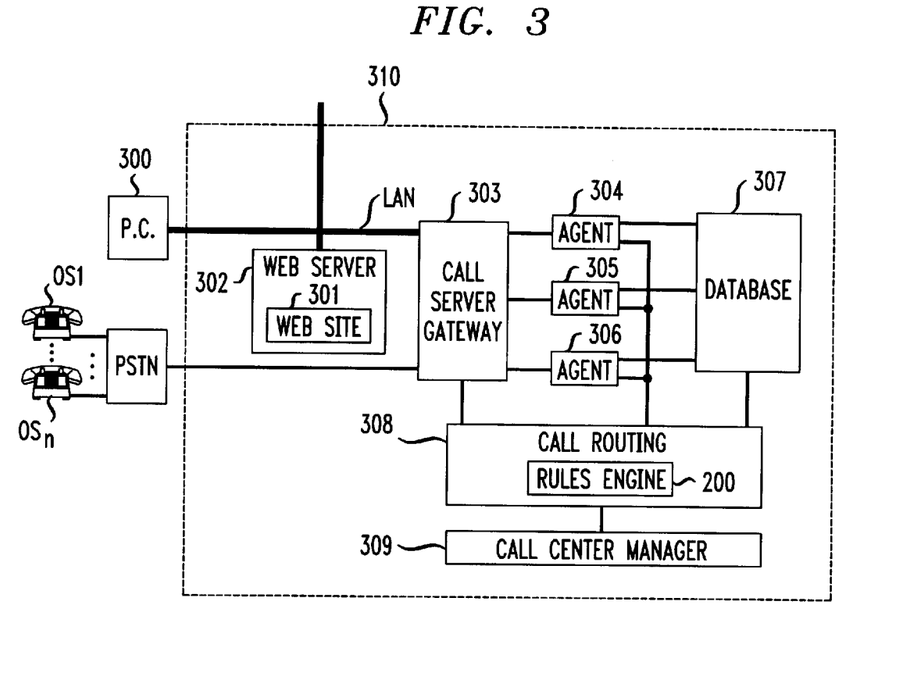
FIG. 3 illustrates in block diagram form the anymedia physical implementation of the call center of FIG. 2, with illustrative call connections.

FIG. 2 illustrates in block diagram form the preferred embodiment of the present media independent communications processing system in the form of a call center architecture, that uses the anymedia call model of FIG. 1 and a rules-based call management paradigm to provide differentiated customer service. FIG. 3 illustrates in block diagram form the anymedia physical implementation of the call center 310. The present media independent communications processing system of FIG. 2 comprises the controlling hardware and software that function to obtain data from and control the operation of the various communication facilities that serve to implement the anymedia call connections. Calls can be placed to the call center 310 with more than one medium and media can be added to or dropped from the communication connection at any time during a call.

The call center 310 functions to selectively interconnect the plurality of customers with the information and services that are provided by the call center 310. To accomplish this function, the incoming call from a customer must be routed in an appropriate and efficient mannerthrough the call center architecture, modeled in FIG. 2, which comprises a hierarchically organized set of facilities and services. This model divides the call center 310 into suites of "rooms", with each suite comprising a plurality of alternate embodiments of that particular layer of the hierarchy. Each suite of rooms is separated from the next hierarchically distinct suite of rooms by a "hallway" that enables the customer to navigate among the various selections available at a particular level of the hierarchy. Using this paradigm, the rules-based call routing process 308 operates a rules engine 200 to enable the customer to provide data, either actively or passively, to define the optimal route through the call center 310 to obtain the services desired by this customer in a customer-specific manner. The rules-based call routing process 308 collects data from the various elements used to implement the call center and also provides data to regulate the operation of the call center elements by use of the rules engine 200.

The various levels of the call center architecture illustrated in FIG. 2 comprise: Accessing Layer 201, Connecting Layer 202, Relating Layer 203, fulfilling Layer 204, and Information Layer 205. It is obvious that not all levels of his architecture are necessarily internal to a specific embodiment of a call center 310, but for completeness of the architecture all levels are illustrated to thereby enable the specific implementation to address all of the potential possibilities that can be envisioned. For example the call center 310 does not encompass the customer's communication devices or the common carrier communication facilities that serve to connect these communication devices to the call center 310, but from a call management perspective, the data that defines these communication devices and the communication facilities are important to enable the rules-based call routing process 308 to perform its function in an efficient manner. Thus, the anymedia call model of FIG. 1, when implemented in the anymedia call center model of FIG. 2, provides a view of the call relevant data that provides the customer with an organized way of navigating through the maze of choices available in the call center architecture to chart a course through the various levels to reach the desired specific information. The navigation is effected by the rules engine 200 of the rules based call routing process 308, using the call context data that is collected by the call context management process 112.

The Accessing Layer 201 comprises a categorization of a plurality of communication devices that the customer may use to initiate a call connection. Those listed in FIG. 2 are typical examples of communication devices and the various entries listed herein can be divided into different combinations than that illustrated herein, depending on the granularity of the divisions that may be desired for a particular application. The entries illustrated are: wired voice terminal, personal computer, cellular voice/data, anymedia terminal, pay phone. Each of these categories represents a subset of well known communication devices and an associated technology that must be served by the call center 310. For the purpose of illustration, the following example uses a customer who is equipped with a anymedia terminal and who desires to access information, resident in the communication and data processing systems that serve the call center 310.

To effect a communication connection to the call center 310, the customer must initiate a call connection in a conventional manner to a point of presence provided by the call center 310 on the appropriate communication network. In this example, the call center 310 has a plurality of such point of presence embodiments to thereby serve customers with diverse types of communication devices. The second level of the architecture represents the Connecting Layer 202 which comprises a plurality of selections of communication medium that are available to the customer. These are: Terminal Communication Protocol (TCP/IP) on an Local Area Network/Wide Area Network (LAN/WAN), Public Telephone Switched Network (PTSN), Integrated Services Digital Network (ISDN), and Asynchronous Transfer Mode (ATM) on an LAN/WAN. As shown in FIG. 2, the customer at the anymedia terminal traverses the first hallway to enter the "room" noted as ATM, which indicates that the customer call connection is implemented from a anymedia terminal via the physical communication facilities implemented in the Asynchronous Transfer Mode of data communication.

The third layer of the hierarchy comprises the Relating Layer 203 which represents the mode of presenting the point of presence to the customer (and possibly also to the agent) once the customer reaches the physical boundary of the call center 310. These selections are: prompting the user with screen pops, ANI hits with screen pops, hypertext, voice message with user prompts, recorded message, and the like. Each of these call center responses are appropriate for a particular customer communication device and/or communication mode, or are based on a customer preference. Therefore, the rules-based call routing process 308 must collect data from the incoming call connection to determine the particulars of this incoming call to thereby provide an appropriate response. If the incoming call data includes an identification of the customer, the rules-based call routing process 308 can access the data stored in one of the databases 307 resident in the call center 310 to retrieve customer-specific data to enhance the appropriateness of the call handling, as is described in additional detail below.

The fourth layer of the hierarchy comprises the Fulfilling Layer 204 which represents the physical apparatus and business process used by the call center to serve the call connection. These include: interactive response, live agent, Web server, FAX back, voice message. The rules-based call routing process directs the incoming call, absent specific selections by the customer, to an appropriate one of these options to thereby create a pseudo personal connection, where the customer has their incoming call processed in a manner that is of greatest interest to this particular customer. This personalization includes the use of call context information, so the serving agent can provide a personalized response, having had access to the context of this particular customer displayed at the time the incoming call is connected to the agent's terminal.

The final layer of the hierarchy comprises the Information Layer 205 that comprises the associated information processing systems that function to provide the goods and services to the customer. These include: customer database, communication context database, order entry scripts, forms, Web pages, customer billing information, back order fulfilment, call context data input by the agents in response to call context changes occasioned by the customer, and the like. These databases are typically resident in a plurality of independently operational data processors.

Rules Engine and Rules Data

Figure 4:
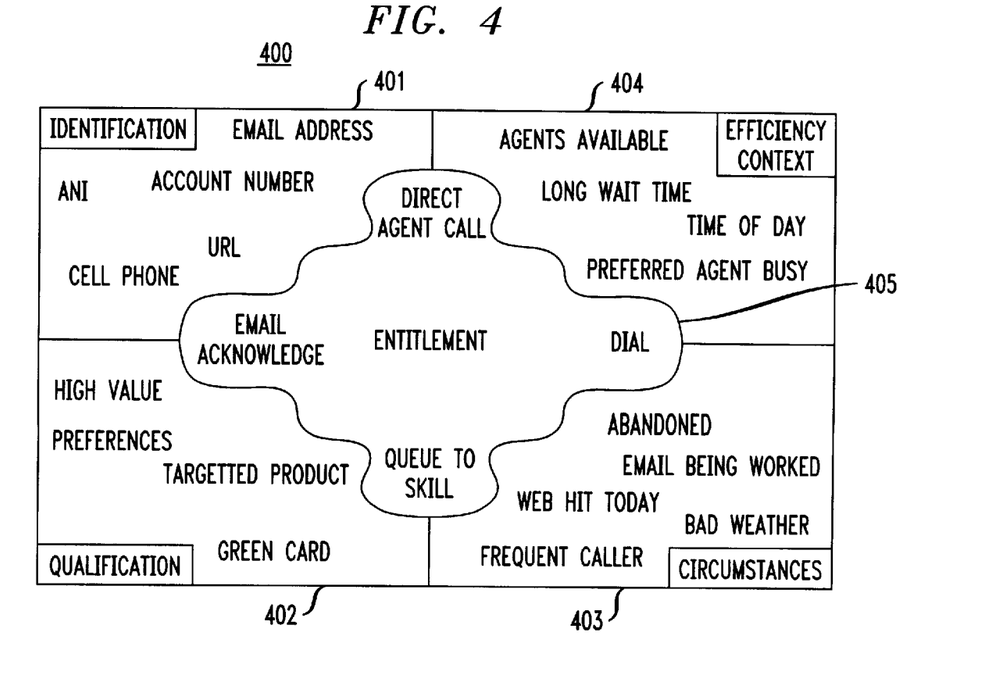
FIGS. 4 and 5 illustrate in block diagram form the architecture of the rules engine data and the rules engine, respectively, for the call center example of FIG. 3 in the processing of a typical call connection.
Figure 5:
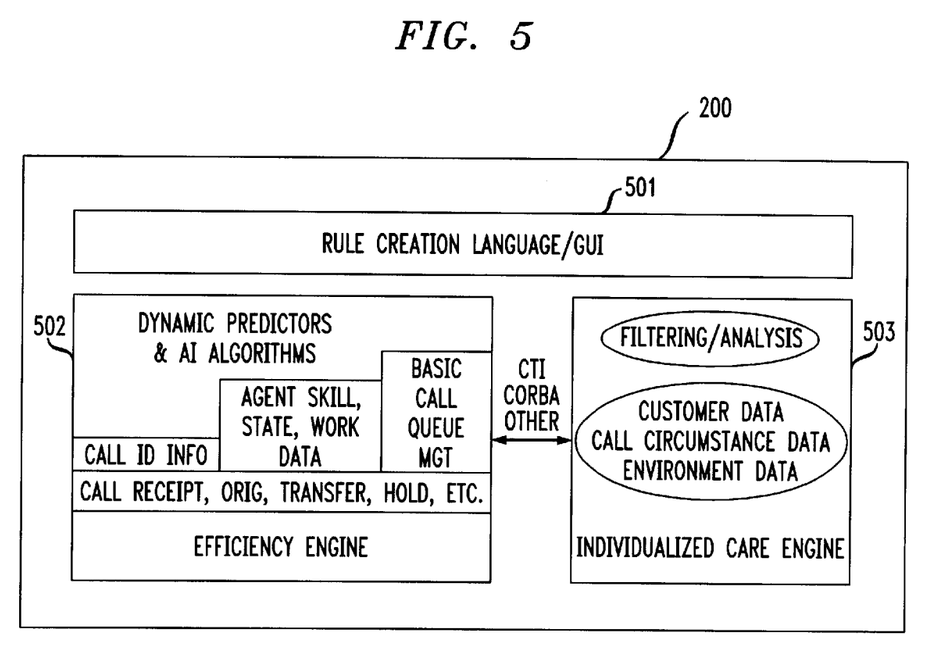

FIGS. 4 and 5 illustrate in block diagram form the architecture of the rules engine data 400 and the rules engine 200, respectively, for the call center example of FIG. 3 in the processing of a typical call connection. In FIG. 4, the data 400 typically contained in the rules engine 200 is divided into a number of categories. The first category is the Identification Data 401 that can be used to assist in the identification of the calling customer. This data represents the information that is available as a result of the calling customer creating a physical call connection to the call center system 310 via some selected communication medium, and is contained in the call context. This data can be caller identification if the calling customer is using a voice line connection from a telephone station set TEL1, TEL2, or E-Mail address if accessing the system via a personal computer 300 and a shared communication network such as an Intranet or the Internet. The second category of rules data comprises the Qualification Data 402 that identifies the importance of this calling customer to the operator of the call center 310. Thus, the customer identification data is used to access account information contained in the database 307 to provide further information that relates to the specific needs of this calling customer. Therefore, the calling customer can be identified as a "high value" customer based upon past volume of sales transactions and may also be identified as the recipient of special discount offers. The third category of rules data comprises Circumstances Data 403 that may impact on the processing of this call connection. Thus, the prior call activity for this calling customer may be an important indicator of the type of service that they should receive. The fourth category of rules data comprises the Efficiency Context Data 404 for the call center 310. This data relates to the present state of operation of the call center and provides an indication of length of queue, status of preferred agents which agent would be best adapted to process this call, and the like. Finally, the fifth category of rules data comprises the Entitlement Data 405 that defines the type of call processing that is appropriate or preferred for this specific calling customer. Thus, the calling customer may prefer personalized service from an agent rather than a voice response system, or the calling customer may prefer immediate service. In addition, an anymedia call instance can be processed where for example the customer initiates a voice call and desires an E-Mail response order confirmation. These categories of rules data are maintained in the rules engine 200 to enable the system to efficiently process the calling customer's call connection.

The rules engine 200 itself is illustrated in block diagram form in FIG. 5 and, for the particular call center example, comprises three components. The rules creation language 501 comprises a user interface that enables a system administrator to create and manage the rules that are used to regulate the operation of the rules engine 200 and thereby regulate the operation of the call center 310. The individualized care engine 503 comprises customer-specific data and the processing of this data to adapt the operation of the call center 310 to most effectively match the preferences of a calling customer. Thus data represents a history of past interactions of the particular customer with the call center 310 as well as accounting data and data collected from other sources that is relevant to the provision of the degree of personalized service to the particular customer. The efficiency engine 502 comprises the call center operation control. This efficiency engine 502 maintains data relating to various aspects of operation of the equipment that comprise the call center 310. Thus, the example illustrated in FIG. 5 shows data collection for caller identification, as well as call status: new call received, call transferred, call on hold, and the like. Furthermore, agent data is maintained: identification of the skill set for each agent, the state of each agent position, and level of activity for each agent. There is also a basic call queue management process that provides a universal queue for incoming call connections. This queue identifies the time-ordered sequence of incoming call connections, regardless of the media that is used to serve the call connection. Thus, the calling customer is served in true order of arrival fashion (or any other queuing algorithm desired), rather than being placed in a queue based upon media type. The call center administrator can adjust the call distribution as a function of the number of calls in the queue of a particular media type. It is envisioned that at least some of the agents are equipped with terminals that enable the agents to process call connections of more than a single media type. The mix of media types processed by a particular agent can therefore be adjusted as a function of the mix of call connections in the universal queue. Finally, the efficiency engine 502 is equipped with a set of dynamic predictors and artificial intelligence algorithms to process all of the above-mentioned data to regulate the handling of the call connections.

Call Routing via Rules Based Process

Figure 6:
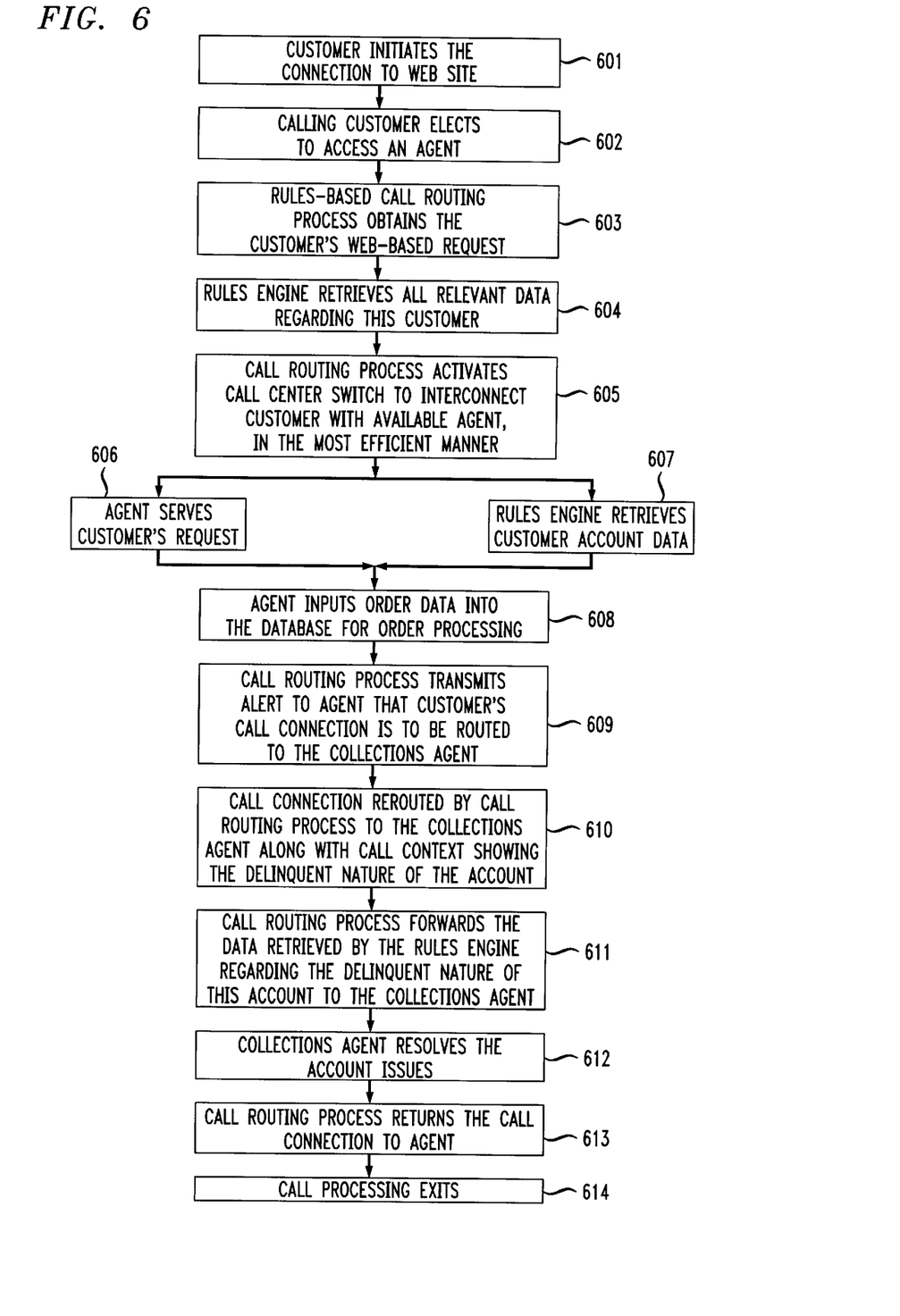
FIG. 6, illustrate in flow diagram form the operation of the rules-based process for the call center example of FIG. 3 in the processing of a typical call connection.

FIG. 3 illustrates in block diagram form the anymedia physical implementation of the call center 310 of FIG. 2, with illustrative call connections while FIGS. 6A, 6B illustrate in flow diagram form the processing of a typical call connection through this system. The customer initiates the call connection at step 601 from a personal computer 300 which the user connects to the call center operator's Web site 301 via an Asynchronous Transfer Mode (ATM) communication connection. The Web site 301 is managed by the Web server 302 which functions to present the Web page images, transmit same to the customer and respond to customer provided input to redirect the customer to the information requested by the customer. Typically, the Web server 302 cycles the customer through a plurality of screen displays as the user navigates through the Web site 301 and its plurality of information choices provided by the Web server 302. In addition, the Web server 302 functions to collect data relating to the identity of the calling customer and any other customer related data that can be used to process this call in the proper context. The collected data is transmitted at step 603 described below by the Web server 302 to the call routing process 308 for inclusion in the rules data 500 portion of the rules engine 200.

The processing of the initial connection for this calling customer comprises the call connection entering the Accessing Layer 201 of FIG. 2 via the Multi-Media Terminal category and receiving a point of presence on the call center system 310 by the rules engine 200 providing an ATM trunk slot on the local area network, which comprises the ATM LAN/WAN category of the Connecting Layer 202 of FIG. 2. The rules engine 200 performs a relationship building function, which comprises a layer of functionality that is overlaid on the connectivity layer. In the relationship building function, the mode of communication that is deemed appropriate by the rules engine 200 for this type of access is the Hyper Text category of the Relating Layer 203, which interconnects the Web Server category of Fulfilling layer 203 with the calling customer. The Web server 302 thus fulfills the customer request and the hypertext is used to learn more about this customer to thereby enable the call center 310 to more effectively serve the customer. The Web Server category has an embodiment in FIG. 3 as Web server 302, which has access to a predefined series of Web Pages that comprise Web site software 301, which comprise a portion of the Information Layer 205. As this call connection is processed, temporary connections are established among the various layers 201–205 and various categories of these layers 201–205 to exchange call context data among the various participants in the call connection.

For the purpose of this description, assume that the calling customer, via the various selections available on a Web page presented by the Web server 302, elects to access an agent within the call center 310. This is accomplished by the user clicking on a selected icon on the display produced as part of a Web page transmitted to the calling customer by the Web server 302 at step 602 which prompts the Web server 302 to redirect the communication connection from the Web server 302 to the call center gateway 303 which functions as a gateway for communication connection routing. The call center gateway 303 communicates with the rules-based call routing process 308 to direct this communication connection to an appropriate destination. The rules engine 200 portion of the rules-based call routing process 308 at step 603 obtains data relating to the customer (Information Layer 205) as part of the communication connection redirection. In particular, the identity of the customer, the particular pages presented at the Web site 302 that were accessed by the customer, the duration of these accesses, customer query information input to the Web server 302 by the customer as part of the Web site access, and the like are transmitted from the Web server 302 to the rules-based call routing process 308. Thus, the call context data that is associated with this customer's access to the call center 310 via the Web server 302 is retained and passed along with the customer's communication connection to the next link in the call connection. The rules-based call routing process 308 prequalifies this call by generating a customer profile and redirecting the communications connection to a selected category of the Fulfilling Layer 204 in the call center 310 based upon the customer-indicated preferences and passively collected customer data. For the selected example, the rules-based call routing process 308 must route the calling customer to a live agent for the processing of this call connection. The routing is processed in the context of the calling customer using data that was collected on the Web, rather than as an anonymous incoming call.

Rules Engine Processing of Incoming Call Data Accumulated Over Multiple Calls Assume for the purposes of this description, that the calling customer has attempted to access the call center agents three times in the last 24 hour period and was unsuccessful in all three attempts due to the agents being busy. When the calling customer elects to access an agent at step 602, the rules-based call routing process 308 as part of the call routing process, activates the rules engine 200 which retrieves all relevant data regarding this customer for processing at step 604. The rules engine 200 retrieves customer related data: Customer Data Base data from the Information Layer 205, Customer Profile Info category of the Relating Layer 203, as well as agent related data from the Load Balancing and Availability categories of the Relating Layer 203 in order to process the customer initiated request. The following data is relevant to this call connection:

Identification: Customer account number, telephone number, Internet address, and the like.

Circumstances: Customer has unsuccessfully attempted to reach an agent three times in a 24 hour period Qualification: Customer is of high value Efficiency Context: All agents are busy and incoming calls are queued The rules engine is programmed with a plurality of rules relating to all aspects of call processing and data collection. An example of one such rule can be the following:

Rule: IF the calling customer is of high value and has abandoned their attempts to contact the call center agents via any medium at least three times in a single 24-hour period, THEN quickly connect the calling customer to an agent, EVEN if the call center is overloaded.

Therefore, once the rules engine 200 receives the data relating to this calling customer's call connection, and history of prior attempts, the rules engine 200 executes the above-noted rule and produces the following result:

Entitlement: Place this calling customer's call connection at top of queue for immediate processing.

The rules engine 200 therefore signals the rules-based call routing process 308 to place this call connection at the head of the incoming call queue and to route this call connection via call center switch 303 to the first available agent, such as agent 304. The agent availability, skill level and agent administration data is considered in the agent selection process for the servicing of this call connection.

The rules-based call routing process 308 thus responds to this decision by activating call center switch 303 at step 605 to interconnect the calling customer with available agent 304. The agent 304 receives call context data from the rules-based call routing process 308 to thereby enable the agent 304 to interact with the calling customer in an informed manner. In particular, the customer-specific context data relating to this call connection is presented to the agent 304 as part of the initial call connection. The agent 304 can be informed of the calling customer's failed attempts, Web site browsing, presently shipped orders, back ordered goods, and the like. The agent 304 can thereby be prepared to intelligently discuss the customer's needs. Thus, at step 606 the agent 304 serves the calling customer's request.

Rules Engine Processing of Account Specific Data

Assume for the purposes of this description, that the calling customer has an account that has become overdue. The account balance is $650.45 and this amount has remained unpaid for more than 60 days. Thus, the following data is retrieved at step 607 by the rules engine 200 from the database 307, concurrently with the agent 304 serving the calling customer's request:

Circumstances: Customer's account is overdue for payment (>60 days) and amount owed ($650.45) is in excess of a predetermined allowable delinquent dollar value ($100.00).

As part of the processing of the input order, the rules engine 200 retrieves the calling customer account data and processes the present transaction information, along with the account data to ensure that any open issues regarding this account and the associated customer are resolved in the single call connection. Thus, the rules engine 200 is typically programmed with a rule, such as the following:

Rule: IF the calling customer has an account balance in excess of $100, and this amount is more than 60 past due, THEN route the call connection to a collection agent once order processing is input but not released.

Therefore, once the rules engine 200 receives the data relating to this calling customer's call connection, the rules engine 200 executes the above-noted rule and produces the following result:

Entitlement: Block release of calling customer order and place this calling customer's call connection at top of queue for immediate processing to collection agent.

Therefore, at step 608, the agent inputs order data into the database 307 for order processing and, at step 609 receives an alert from the rules-based call routing process 308 that the calling customer's call connection is to be routed to the collections agent 306 and the present order will not be entered until satisfactory resolution of the collection matter is obtained. The call connection is then rerouted by the rules-based call routing process 308 activating the call center switch 303 to interconnect the call connection to the collections agent 306 at step 610. The collections agent 306 is connected to the calling customer and at step 611 the rules-based call routing process 308 forwards the data retrieved by the rules engine 200 regarding the delinquent nature of this account to the collections agent 306. The collections agent is connected to the database 307 and can access additional customer specific data therefrom. By automatically forwarding the call connection and all of the call context data associated with this call connection and the calling customer, the collections agent can be informed of the present order, past orders, customer identity, overdue account status and the like. The collections agent 306 at step 612 can therefore resolve the account issues and, assuming successful resolution of these issues, signal the rules-based call routing process 308 at step 613 to return the call connection to agent 304 or any other available agent. Again, the call context data is forwarded with the call connection to enable the agent 304 to process the order without requiring further information from the calling customer. Once the order is placed, call processing exits at step 614.

SUMMARY

Thus, the present media independent communications processing system implements a rules-based call routing process that utilizes the identity of the calling party, the call context and anymedia content of a communication connection to effect routing the call to a destination that is appropriate to the call in terms of anymedia communications capabilities and information content, in a manner heretofore unknown in call processing. This rules-based call routing process also maximizes the call center efficiency and agent productivity.

What is claimed:

1. A media independent communications management system that is operational in a communication service providing system for interconnecting a customer, who is using a communication device having predetermined media characteristics, in a communication session with a selected one of a plurality of information sources that are resident in said communication service providing system, comprising:

means for determining a mode of communication of said communication device;

means for retrieving data relating to said customer to create a call context indicative of characteristics of said customer and said communication session;

means, responsive to said call context, for establishing a communication connection through said communication service providing system to a selected one of said plurality of information sources in said communication service providing system that is capable of communicating in said determined mode of communication.

2. The media independent communications management system of claim 1 wherein said means for establishing comprises:

means for processing said communication session in a unified work queue independent of said mode of communication.

3. The media independent communications management system of claim 1 wherein said means for establishing comprises:

means for rules based call routing using said context information to assist in the call navigation to said selected one of said plurality of information sources.

4. The media independent communications management system of claim 3 wherein said means for rules based call routing comprises:

means, responsive to data generated in said call session, for transferring said communication connection to another of said plurality of information sources; and means for forwarding said call context to said another of said plurality of information sources.

5. The media independent communications management system of claim 4 wherein said means for transferring comprises:

means for collecting data from said customer and said selected one of said plurality of information sources pursuant to said communication session;

means for analyzing said collected data concurrent with said communication session; and means for automatically transferring said communication connection to another of said plurality of information sources based upon said concurrent data analysis.

6. The media independent communications management system of claim 5 wherein said means for transferring further comprises:

means for automatically transferring said communication connection to another of said plurality of information sources based upon a change in said mode of communication of said communication device.

7. The media independent communications management system of claim 3 wherein said means for rules based call routing comprises:

efficiency engine means for managing operation of said plurality of information sources; and customer satisfaction engine means for processing customer-specific data to adapt the operation of said media independent communications management system to most effectively match the preferences of said customer.

8. The media independent communications management system of claim 7 wherein said means for rules based call routing further comprises:
   means for maintaining data for use by said efficiency engine means and said customer satisfaction engine means.

9. The media independent communications management system of claim 8 wherein said means for maintaining data comprises:
   means for maintaining identification data comprising information that is available as a result of said communication connection;
   means for maintaining qualification data comprising information that identifies the importance of said customer; and
   means for maintaining entitlement data comprising information that defines the type of call processing appropriate for said customer.

10. The media independent communications management system of claim 9 wherein said means for maintaining data further comprises:
    means for maintaining circumstances data comprising information that may impact on the processing of this communication connection; and
    means for maintaining efficiency context data comprising information that relates to the present state of operation of media independent communications management system.

11. The media independent communications management system of claim 1 further comprising:
    means for modeling said media independent communications management system using a rooms and halls paradigm to characterize both said plurality of information sources and communication facilities contained in said media independent communications management system to effect said communication connection.

12. The media independent communications management system of claim 11 wherein said means for establishing comprises:
    means for rules based call routing using said context information and said rooms and halls paradigm to select ones of said communication facilities contained in said media independent communications management system to effect said communication connection to said selected one of said plurality of information sources.

13. The media independent communications management system of claim 11 wherein said means for modeling comprises:
    means for managing a connecting layer comprising a plurality of selections of communication medium that are available to said customer;
    means for maintaining a relating layer comprising a plurality of selections of presenting a point of presence to said customer;
    means for maintaining a fulfilling layer comprising a plurality of selections of physical apparatus and business process used to serve said call connection; and
    means for maintaining an information layer comprising a plurality of selections of information processing systems that function to provide services to said customer.

14. The media independent communications management system of claim 1 wherein said means for retrieving data comprises:
    means for maintaining records of prior call activity of said customer with said media independent communications management system.

15. The media independent communications management system of claim 1 wherein said means for retrieving data comprises:
    means for querying databases accessible by said plurality of information sources to retrieve data contained therein relating to said customer.

16. A method of operating a media independent communications management system that is operational in a communication service providing system for interconnecting a customer, who is using a communication device having predetermined media characteristics, in a communication session with a selected one of a plurality of information sources that are resident in said communication service providing system, comprising the steps of:
    determining a mode of communication of said communication device;
    retrieving data relating to said customer to create a call context indicative of characteristics of said customer and said communication session;
    establishing, in response to said call context, a communication connection through said communication service providing system to a selected one of said plurality of information sources in said communication service providing system that is capable of communicating in said determined mode of communication.

17. The method of operating a media independent communications management system of claim 16 wherein said step of establishing comprises:
    processing said communication session in a unified work queue independent of said mode of communication.

18. The method of operating a media independent communications management system of claim 1 wherein said step of establishing comprises:
    rules based call routing using said context information to assist in the call navigation to said selected one of said plurality of information sources.

19. The method of operating a media independent communications management system of claim 3 wherein said step of rules based call routing comprises:
    transferring, in response to data generated in said call session, said communication connection to another of said plurality of information sources; and
    forwarding said call context to said another of said plurality of information sources.

20. The method of operating a media independent communications management system of claim 19 wherein said step of transferring comprises:
    collecting data from said customer and said selected one of said plurality of information sources pursuant to said communication session;
    analyzing said collected data concurrent with said communication session;
    and automatically transferring said communication connection to another of said plurality of information sources based upon said concurrent data analysis.

21. The method of operating a media independent communications management system of claim 20 wherein said step of transferring further comprises:
    automatically transferring said communication connection to another of said plurality of information sources based upon a change in said mode of communication of said communication device.

22. The method of operating a media independent communications management system of claim 18 wherein said step of rules based call routing comprises:

managing operation of said plurality of information sources; and processing customer-specific data to adapt the operation of said media independent communications management system to most effectively match the preferences of said customer.

23. The method of operating a media independent communications management system of claim 22 wherein said step of rules based call routing further comprises:

maintaining data for use by said step of managing operation and said step of processing customer-specific data.

24. The method of operating a media independent communications management system of claim 23 wherein said step of maintaining data comprises:

maintaining identification data comprising information that is available as a result of said communication connection;

maintaining qualification data comprising information that identifies the importance of said customer; and maintaining entitlement data comprising information that defines the type of call processing appropriate for said customer.

25. The method of operating a media independent communications management system of claim 24 wherein said step of maintaining data further comprises:

maintaining circumstances data comprising information that may impact on the processing of this communication connection; and maintaining efficiency context data comprising information that relates to the present state of operation of media independent communications management system.

26. The method of operating a media independent communications management system of claim 16 further comprising the step of:

modeling said media independent communications management system using a rooms and halls paradigm to characterize both said plurality of information sources and communication facilities contained in said media independent communications management system to effect said communication connection.

27. The method of operating a media independent communications management system of claim 26 wherein said step of establishing comprises:

rules based call routing using said context information and said rooms and halls paradigm to select ones of said communication facilities contained in said media independent communications management system to effect said communication connection to said selected one of said plurality of information sources.

28. The method of operating a media independent communications management system of claim 26 wherein said step of modeling comprises:

managing a connecting layer comprising a plurality of selections of communication medium that are available to said customer;

maintaining a relating layer comprising a plurality of selections of presenting a point of presence to said customer;

maintaining a fulfilling layer comprising a plurality of selections of physical apparatus and business process used to serve said call connection; and maintaining an information layer comprising a plurality of selections of information processing systems that function to provide services to said customer.

29. The method of operating a media independent communications management system of claim 16 wherein said step of retrieving data comprises:

maintaining records of prior call activity of said customer with said media independent communications management system.

30. The method of operating a media independent communications management system of claim 16 wherein said step of retrieving data comprises:

querying databases accessible by said plurality of information sources to retrieve data contained therein relating to said customer.

31. A media independent communications management system that is operational in a call center system for interconnecting a customer, who is using a communication device having predetermined media characteristics, with a selected one of a plurality of agents that are accessible via said call center system, comprising: means for determining a mode of communication active at said communication device;

means for establishing a communication connection through said call center system to a selected one of said plurality of agents that is equipped to communicate in said determined mode of communication;

means for retrieving data relating to said customer from a plurality of database sources to create a call context;

means for providing said customer data to said agent at initiation of said communication connection; and means for maintaining call context data indicative of characteristics of said customer and said communication connection as said communication connection is routed among agents.

32. The media independent communications management system of claim 31 wherein said means for establishing comprises:

means for processing said communication connection in a unified work queue independent of said mode of communication.

33. The media independent communications management system of claim 31 wherein said means for establishing comprises:

efficiency engine means for managing operation of said plurality of information sources;

customer satisfaction engine means for processing customer-specific data to adapt the operation of said media independent communications management system to most effectively match the preferences of said customer; and means for maintaining data for use by said efficiency engine means and said customer satisfaction engine means.

34. The media independent communications management system of claim 33 wherein said means for maintaining data comprises:

means for maintaining identification data comprising information that is available as a result of said communication connection;

means for maintaining qualification data comprising information that identifies the importance of said customer; and means for maintaining entitlement data comprising information that defines the type of call processing appropriate for said customer.

35. The media independent communications management system of claim 34 wherein said means for maintaining data further comprises:

means for maintaining circumstances data comprising information that may impact on the processing of this communication connection; and means for maintaining efficiency context data comprising information that relates to the present state of operation of media independent communications management system.

36. The media independent communications management system of claim 31 further comprising:

means for modeling said media independent communications management system using a rooms and halls paradigm to characterize both said plurality of information sources and communication facilities contained in said media independent communications management system to effect said communication connection.

37. The media independent communications management system of claim 36 wherein said means for establishing comprises:

means for rules based call routing using said context information and said rooms and halls paradigm to select ones of said communication facilities contained in said media independent communications management system to effect said communication connection to said selected one of said plurality of information sources.

38. The media independent communications management system of claim 36 wherein said means for modeling comprises:

means for managing a connecting layer comprising a plurality of selections of communication medium that are available to said customer;

means for maintaining a relating layer comprising a plurality of selections of presenting a point of presence to said customer;

means for maintaining a fulfilling layer comprising a plurality of selections of physical apparatus and business process used to serve said call connection; and means for maintaining an information layer comprising a plurality of selections of information processing systems that function to provide services to said customer.

39. The media independent communications management system of claim 31 wherein said means for retrieving data comprises:

means for maintaining records of prior call activity of said customer with said media independent communications management system.

40. The media independent communications management system of claim 31 wherein said means for retrieving data comprises:

means for querying databases accessible by said plurality of information sources to retrieve data contained therein relating to said customer.

41. A method of operating a media independent communications management system that is operational in a call center system for interconnecting a customer, who is using a communication device having predetermined media characteristics, with a selected one of a plurality of agents that are accessible via said call center system, comprising the steps of:

determining a mode of communication active at said communication device;

establishing a communication connection through said call center system to a selected one of said plurality of agents that is equipped to communicate in said determined mode of communication;

retrieving data relating to said customer from a plurality of database sources to create a call context;

providing said customer data to said agent at initiation of said communication connection; and maintaining call context data indicative of characteristics of said customer and said communication connection as said communication connection is routed among agents.

42. The method of operating a media independent communications management system of claim 41 wherein said step of establishing comprises:

processing said communication connection in a unified work queue independent of said mode of communication.

43. The method of operating a media independent communications management system of claim 41 wherein said step of establishing comprises:

managing operation of said plurality of information sources;

processing customer-specific data to adapt the operation of said media independent communications management system to most effectively match the preferences of said customer; and maintaining data for use by said step of managing operation and said step of processing customer-specific data.

44. The method of operating a media independent communications management system of claim 43 wherein said step of maintaining data comprises:

maintaining identification data comprising information that is available as a result of said communication connection;

maintaining qualification data comprising information that identifies the importance of said customer; and maintaining entitlement data comprising information that defines the type of all processing appropriate for said customer.

45. The method of operating a media independent communications management system of claim 44 wherein said step of maintaining data further comprises:

maintaining circumstances data comprising information that may impact on the processing of this communication connection; and maintaining efficiency context data comprising information that relates to the present state of operation of media independent communications management system.

46. The method of operating a media independent communications management system of claim 41 further comprising the step of:

modeling said media independent communications management system using a rooms and halls paradigm to characterize both said plurality of information sources and communication facilities contained in said media independent communications management system to effect said communication connection.

47. The method of operating a media independent communications management system of claim 46 wherein said step of establishing comprises:

rules based call routing using said context information and said rooms and halls paradigm to select ones of said communication facilities contained in said media independent communications management system to effect said communication connection to said selected one of said plurality of information sources.

48. The method of operating a media independent communications management system of claim 46 wherein said step of modeling comprises:

managing a connecting layer comprising a plurality of selections of communication medium that are available to said customer;

maintaining a relating layer comprising a plurality of selections of presenting a point of presence to said customer;

maintaining a fulfilling layer comprising a plurality of selections of physical apparatus and business process used to serve said call connection; and maintaining an information layer comprising a plurality of selections of information processing systems that function to provide services to said customer.

49. The method of operating a media independent communications management system of claim 41 wherein said retrieving data comprises:

maintaining records of prior call activity of said customer with said media independent communications management system.

50. The method of operating a media independent communications management system of claim 41 wherein said retrieving data comprises:

querying databases accessible by said plurality of information sources to retrieve data contained therein relating to said customer.

* * * * *